United States Patent
Gorelik et al.

(10) Patent No.: US 10,210,375 B2
(45) Date of Patent: Feb. 19, 2019

(54) MOUSE WITH EMBEDDED CAMERA AND EMBEDDED MICROPHONE FOR ACTIVE BIOMETRIC AUTHENTICATION

(71) Applicants: Victor Gorelik, Brooklyn, NY (US); Alexander Fursenko, Moscow (RU)

(72) Inventors: Victor Gorelik, Brooklyn, NY (US); Alexander Fursenko, Moscow (RU)

(*) Notice: Subject to any disclaimer, the term of this patent is extended or adjusted under 35 U.S.C. 154(b) by 488 days.

(21) Appl. No.: 14/034,274

(22) Filed: Sep. 23, 2013

(65) Prior Publication Data

US 2015/0084867 A1    Mar. 26, 2015

(51) Int. Cl.
| | | |
|---|---|---|
| G06K 9/00 | (2006.01) | |
| H04L 29/06 | (2006.01) | |
| G06F 3/0354 | (2013.01) | |
| H04L 9/32 | (2006.01) | |

(52) U.S. Cl.
CPC ..... G06K 9/00033 (2013.01); G06F 3/03543 (2013.01); H04L 9/3231 (2013.01); H04L 63/0861 (2013.01); H04L 2209/42 (2013.01)

(58) Field of Classification Search
CPC .... G06F 3/0317; G06F 3/03543; G06F 3/038; G06F 3/0304; G06F 3/0383; G06K 9/00033
USPC ................................................. 345/166, 163
See application file for complete search history.

(56) References Cited

U.S. PATENT DOCUMENTS

| | | | |
|---|---|---|---|
| 2004/0069846 A1* | 4/2004 | Lambert | G06F 21/32 235/382 |
| 2005/0057530 A1* | 3/2005 | Hinckley et al. | 345/173 |
| 2007/0132733 A1* | 6/2007 | Ram | 345/163 |
| 2009/0083847 A1* | 3/2009 | Fadell et al. | 726/16 |
| 2012/0110340 A1* | 5/2012 | Lyseggen et al. | 713/186 |
| 2012/0131350 A1* | 5/2012 | Atherton | 713/186 |
| 2013/0328774 A1* | 12/2013 | Chen et al. | 345/158 |

OTHER PUBLICATIONS

J. K. Doylend, M. J. R. Heck, J. T. Bovington, J. D. Peters, L. A. Coldren, and JT E. Bowers, 'Two-dimensional free-space beam streering with and optical phased array on silicon-on-insulator,' Opt. Express 19, 21595-21604 (2011).*

* cited by examiner

*Primary Examiner* — Claire X Pappas
*Assistant Examiner* — Ngan T Pham Lu

(57) ABSTRACT

The invention provides a device and a method for frequent verifications of the identity of a user performed during a long session of client-server communication by secure exchange of keys between the client and the server. The device is a computer mouse with embedded camera and embedded microphone. The camera is used to make pictures of a user's palm; the microphone is used to register a sound of user's pulse. The method has zero privacy leakage because the user is represented at the server by an array of random numbers, which have nothing to do with his biometric data. The security of the system is difficult to break because the exchange keys are different on each request/response.

1 Claim, 5 Drawing Sheets

MOUSE WITH EMBEDDED CAMERA AND EMBEDDED MICROPHONE FOR ACTIVE BIOMETRIC AUTHENTICATION

CROSS REFERENCE TO RELATED APPLICATIONS

This application is related to U.S. patent application Ser. No. 13/936,190, filed on Jul. 7, 2013, and entitled "Active biometric authentication with zero privacy leakage", submitted by Victor Gorelik and Natalia Hanson.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING COMPACT DISC APPENDIX

Not applicable.

TECHNICAL FIELD

This invention relates to authentication of a user in client-server communication, in particular to multiple biometrical authentications of a user being performed during a long session (5 minutes or more) of client-server communication.

BACKGROUND

There are different authentication schemes in computer security that perform user authentication in client-server communication. A traditional scheme, which is usually used by a user to log in to the server, is based on security credentials provided by the user, e.g., a password or a fingerprint. Another scheme active biometric authentication, which is the subject of the present invention, is used during a long session of client-server communication, which starts when a user logs in to the server and ends when he logs out. During a long session, a series of user authentications is done to make sure that the same user is in control of the client during the entire session. This scheme does not require any intended actions from a user; user authentications are performed seamlessly, without interruptions of user activity.

To perform a series of user authentications, the server generates authentication requests. On each request, the server creates and sends a request key to the client. Specific biometric information of a user is being collected in background on the client during an entire session. In reply to a server request, the client uses this biometric information to create a response key to the server. The server verifies the user based on the received response key.

The main problems of biometric authentication are the security of the communications and risk for the privacy of a user.

U.S. Pat. No. 6,487,662 provides biometric system for biometric input, authentication and access control in client-server communications. The system is based on optical scanner embedded into the computer mouse, which allows scanning a thumb of the user. This system cannot be used for active biometrical authentication because in order to input biometric data, a user has to perform a series of actions.

Another disadvantage of the method is that reference fingerprints are saved in a data base, which puts privacy of a user under the risk.

The privacy can be protected by bio encryption methods [Yevgeniy Dodis, Rafail Ostrovsky, Leonid Reyzin, Adam Smith. 2008. Fuzzy Extractors: How to Generate Strong Keys from Biometrics and Other Noisy Data, SIAM Journal Computing, 38, 1 (January 2008), 97-139. http://www.cs.b-u.edu/~reyzin/fuzzy.html]. These methods are based on using representation templates saved in special data bases. This approach implies a small but non-zero privacy leakage. Moreover, if a hacker gets access both to the templates and to the encryption algorithms, he can break the system [Ann Cavoukian, Alex Stoianov. 2007. Biometric Encryption: A Positive-Sum Technology that Achieves Strong Authentication, Security AND Privacy. Discussion paper of the Office of the Information and Privacy Commissioner of Ontario, 2007. http://www.ipc.on.ca/images/Resources/bio-encryp.pdf].

Besides protection of representation templates by means of cryptography, it is possible to protect templates by intentionally distorting biometric data [U.S. Pat. No. 6,836,554]. Such feature transformation methods have difficulties in theoretical analysis related to closeness of biometric records and problems of irreversibility and unlinkability of transformations [Manabu Inuma, Akira Otsuka. 2013. Relations among Security Metrics for Template Protection Algorithms. arXiv:1212.4195 v2 [cs.CR]. Cornell University Library. http://arxiv.org/pdf/1212.4195.pdf].

In U.S. patent application Ser. No. 13/936,190 a method of active biometrical authentication with zero privacy leak and high level of security of communications is proposed. The method is based on standard equipment—laptop with webcam and microphone—and on processing of facial images. The drawback of using facial images is that the results depend on illumination of the face in great degree; besides, the face can be turned under significant angle or blocked by hands during the session. These factors complicate the process of the authentication.

SUMMARY

It is therefore an objective of the present invention to provide a device and a method for active biometric authentication with zero privacy leak and with high level of security of communications so that the device and the method deliver stable illumination and stable biometrical object.

The proposed device is a computer mouse with embedded camera and embedded microphone. The camera is used to make pictures of a user's palm; the microphone is used to register a sound of user's pulse. The cover of the mouse has an area which is transparent to the light; this area is closed by the palm during the work of the mouse; the palm is illuminated by a source of light embedded into the mouse.

The proposed method is based on extracting biometrical data from the palm's image and on building an array C which depends on this data. To make an authentication, the server sends encoded random number to the client. The client decodes the number and returns a response key, built on the base of the decoded number and on array C. The server makes verification decision based on comparison of the received response with a user representational array created at the server in the beginning of the session. The security of the system is difficult to break because the encoding/decoding keys are different on each request/response. Even if a security breach was possible it would not harm the user's privacy, because the user is represented at the server by an array of random numbers, which have nothing to do with his biometric data. Along with advantages provided by U.S. patent application Ser. No. 13/936,190—zero privacy leak and high level of security—the present application provides means for stable illumination of the palm and relatively stable position of the palm itself, compared with illumination and position of the face in U.S. patent application Ser. No. 13/936,190. Processing of the sound of the user's pulse creates additional level of security.

DETAILED DESCRIPTION OF THE INVENTION

To participate in client-server communication, a user creates an account on the server.

A user gets access to his account (logs in to the server) using a common access card (and/or a secret input known only to the user) on the client computer.

The proposed method for active biometric user authentication during a session of client-server communication includes two following steps:

(1) A login of a user to a session;
(2) User authentication (identity verification).

The first step is one time operation performed simultaneously with login to the server; the second step can be performed multiple times during a session.

Figure 1:
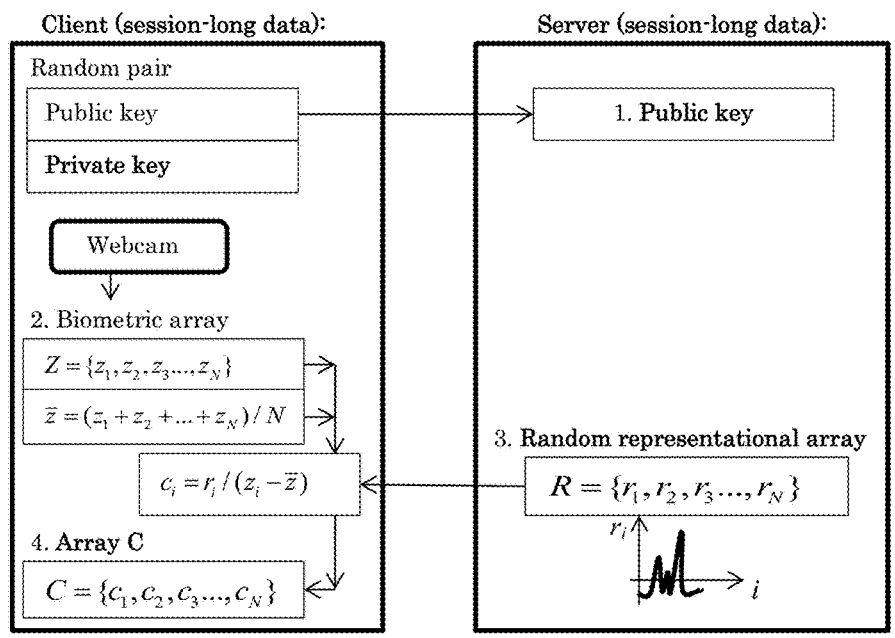
FIG. 1 illustrates a login of a user to a session of client-server communication.

FIG. 1 illustrates the sequence of four operations performed in the step 1 (a login of a user to a session):

1.1. RSA keys generation (on the client);
1.2. Biometric array extraction (on the client);
1.3. A random representational array generation (on the server);
1.4. Calculation of a multiplication array C (on the client).

Operation 1.1: Public and private keys for RSA encryption are generated on the client, and the public key is sent to the server. The purpose of creating RSA encryption keys is explained below. After the end of the session, both the private key and the public key are discarded.

Operation 1.2: The biometric data of the user is collected on the client as an array Z of N components: $Z=\{z_1, z_2, z_3 \ldots, z_N\}$. A technique for collecting a biometric array based on a palm image is given below. The components of the array Z are internal variables of a program running on the client. The assumption is used that these variables are inaccessible to a hacker. At the same time, data stored on hardware of the client or the server, data transmitted between the client and the server, and all encoding/decoding algorithms are considered accessible to a hacker.

Operation 1.3: A random representational array $R=\{r_1, r_2, r_3 \ldots, r_N\}$ is generated at the server. Array R represents the user until the end of the session.

Operation 1.4: An array $C=\{c_1, c_2, c_3 \ldots, c_N\}$ is calculated by the formulas:

$$c_1=r_1/(z_1-\bar{z}),$$

$$c_2=r_2/(z_2-\bar{z}),$$

$$\ldots,$$

$$c_N=r_N/(z_N-\bar{z}),$$

where $\bar{z}=(z_1+z_2+\ldots+z_N)/N$. If one of the components of the array Z is equal to $\bar{z}$, e.g. $z_1=\bar{z}$, then calculation of C using these formulas is impossible (division by zero). Such a situation can be easily avoided. For example, all $z_i$ can be scaled so that they are located between 0 and 1; then adding to the array Z of N more artificial points $z_{N+1}, z_{N+2}, z_{N+3}, \ldots, z_{2N}$ calculated by the formula $z_{N+i}=3-z_i$ solves the problem. In this case, $\bar{z}=1.5$ and is different from all 2N values $z_i$; N more random numbers $r_i$ have to be added to the array R. As soon as the array R is generated and the array C is calculated, the biometric array Z is discarded.

During the session four variables shown in FIG. 1 in bold remain constant: private key and array C are internal variables of a program running on the client, public key and the array R are internal variables of a program running on the server. When the session ends, all four variables are discarded.

Figure 2:
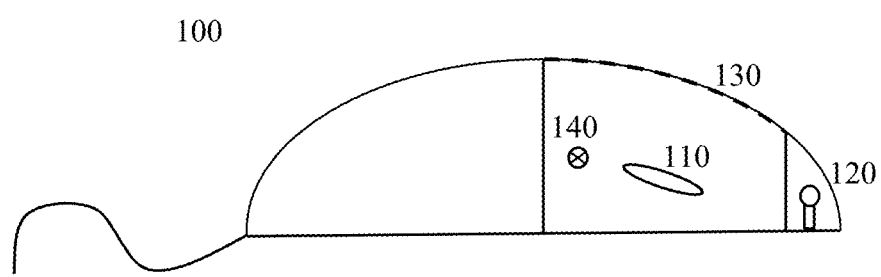
FIG. 2 illustrates a mouse with an embedded camera and an embedded microphone.

FIG. 2 illustrates the proposed device for creating a biometric array Z based on a palm image of a user. The device 100 is a computer mouse with embedded camera 110 and embedded microphone 120. The camera is used to make pictures of a user's palm; the microphone is used to register a sound of a user's pulse. The cover of the mouse has an area 130 which is transparent to the light; this area is closed by the palm during the work of the mouse; the palm is illuminated by a source of light 140 embedded into the mouse.

Figure 3:
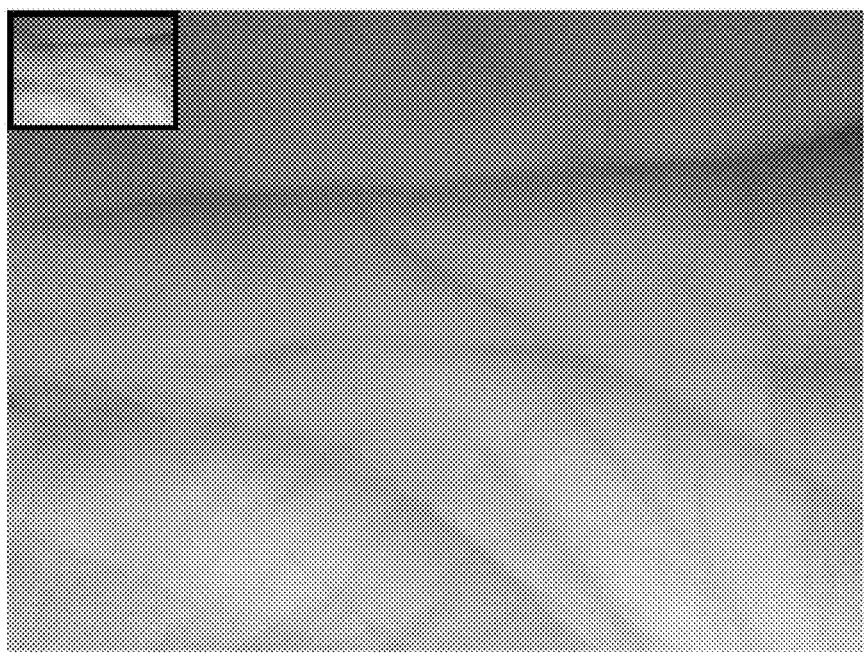
FIG. 3 illustrates a way of creating an array of biometric data based on an image of a user's palm.

FIG. 3 illustrates one of possible ways of creating a biometric array Z based on a palm image of a user. The process starts with recording a color picture 500×350 of a palm by a camera (all image dimensions are given in pixels). Then this picture is transformed to a black and white sketch, an example of which is shown in FIG. 3.

The image is converted into a 100×70 image shown in the top left corner of the sketch in FIG. 3. This conversion makes a position of the palm relative to the mouse less important.

Finally, all 100×70 pixels are permuted in a random order and the brightness of pixels is multiplied by a sequence of random 100×70 numbers equally distributed between zero and one. The permutation and the multiplying sequence are generated based on the information specific to an authorized user, e.g. on the information extracted from the common access card (and/or from a secret input known only to the user)—the information the hacker does not have.

As a result, the biometric array Z is presented as an array $\{z_i\}$ of pixel brightness, where $0<=i<7000$ and $0<=z_i<256$.

Figure 4:
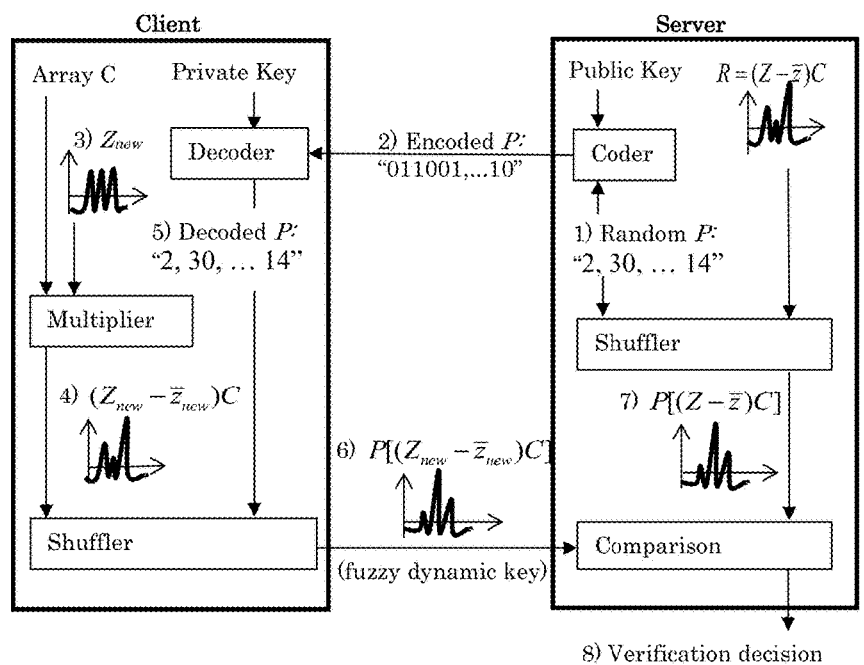
FIG. 4 illustrates the step of user authentication.

FIG. 4 illustrates the step 2 (user authentication) of the proposed method. The authentication process is initiated by the user's attempt to download information. The user clicks on the corresponding link. As a result the picture of his palm is made and the process of the user authentication comprising eight following operations (numerated in the FIG. 4) is activated.

The Server 2.1) generates random permutation P of N integers, e.g. "2, 30, 31, 4, . . . 8, 14", 2.2) encodes this string with the public key and sends encoded string to the client.

The Client 2.3) extracts biometric array $Z_{new}$ from the palm's picture, 2.4) builds array $(Z_{new}-\bar{Z}_{new})C$;

2.5) decodes permutation P using the string received from the server and the private key (which is a variable of the program running at the client), 2.6) applies decoded permutation P to $(Z_{new}-\bar{z}_{new})C$ and submits permuted array $P[(Z_{new}-\bar{z}_{new})C]$ to the server. Note that when $Z_{new}=Z$, this response key is exactly equal to P[R].

The Server 2.7) applies the generated permutation P to the representational array R, which was created at the server during the login of the user to the session and which is equal to $(Z-\bar{z})C$.

2.8) calculates correlation coefficients between the resulting array $P[(Z-\bar{z})C]$ and the array $P[(Z_{new}-\bar{z}_{new})C]$ submitted by the client, and makes a verification decision.

If the correlation coefficient is close to 1, the user is verified positively; otherwise, not.

The reason that the correlation coefficient is required to be close to 1 is as follows. If the average values of any two arrays A and B are equal to zero (it is the case for $A=(Z-\bar{z})$ and for $B=(Z_{new}-\bar{z}_{new})$) and the correlation coefficient between these arrays A and B is equal to 1, then after multiplication of each of the arrays component-by-component by the same array C, the correlation coefficient between arrays $\{a_1*c_1, a_2*c_2, a_3*c_3, \ldots, a_N*c_N\}$ and $\{b_1*c_1, b_2*c_2, b_3*c_3, \ldots, b_N*c_N\}$ is equal to 1 as well; a permutation of the last two arrays in the same order also does not change their correlation coefficient. If this correlation coefficient is equal to 1, it means $Z=const*Z_{new}$, so Z and $Z_{new}$ are extracted from biometric data of the same user.

The proposed system is very difficult to break for the following reasons.

A hacker's time to operate is limited by the length of a session because private and public keys, a multiplication array C, and a representational array R are different in each session. A permutation P is different for each request and a fuzzy dynamic response key $P[(Z_{new}-\bar{z}_{new})C]$ is different for each response.

To get access to the server, the hacker has to produce a permuted representational array; having just a representational array is not enough for that. The hacker can intercept an encoded permutation string sent from the server, but he has to decode it in order to build a permuted representational array. However, the corresponding private key to do that is not available to him since it is not stored anywhere (it is an internal variable of a program running on the client). So the hacker can only use the trial and error method. In the proposed scheme, he has just one attempt to break encryption per response because permutations are randomly generated for each request.

To estimate a probability that the system could be broken by a chance, consider the correlation coefficient between the permuted representation array P[R] and a trial array randomly generated by an attacker. The access to the server will be granted if this correlation coefficient is greater than some threshold value $\rho_0$ which is "close" to 1, e.g. $\rho_0=0.7$. Assume for simplicity that components of both arrays can take with equal probability only two values—0 and 255. In this case the distribution of the calculated correlation coefficient can be approximated by the normal distribution with zero mean and standard deviation equal to $0.5/\sqrt{7000}$. The probability to have the correlation coefficient greater than 0.7 and to break the system by a chance is estimated by $10^{-13216}$, which is equal to the first term of the asymptotic expansion of error function: $\exp(-x^2)/(2x^3\sqrt{\pi})$, where $x=0.7\sqrt{2}/(0.5/\sqrt{7000})$.

Of course, the hacker would not try generating the trial array randomly. He would rather build the trial array using palm images from available data bases or created artificially. Because all people are created similar—a palm has similar lines—this strategy could produce a palm image having correlation coefficient with the palm image of an authorized user greater than 0.7, and, as a result, the system could be broken. To prevent this possibility, the components of the 100×70 image have been additionally permuted and multiplied by a random sequence as it was described above. There is no notion of palm lines after such a transformation; all the pixels of the transformed image are independent, and, hence, the estimate of the previous paragraph holds.

Additional level of security is provided by using microphone records of the user's pulses. The records are made when the user holds the mouse, e.g. when he clicks a link to download information.

Figure 5:
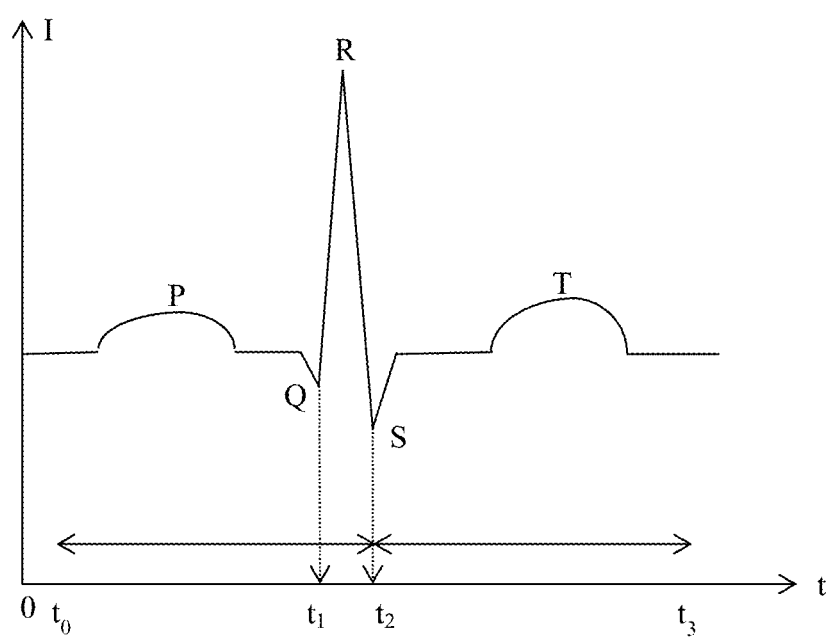
FIG. 5 illustrates the shape of a pulse.

A typical shape of the pulse is illustrated in FIG. 5. The pulse has 5 peaks—P, Q, R, S, T; the length of the pulse is about one second.

The biometrical array Z is extracted from the microphone record as follows.

Positions of peaks Q and R are found; it gives values $t_1$ and $t_2$, see FIG. 5.

The length of time interval $\Delta t$ is calculated so that $t_2-t_1=100 \Delta t$. This time interval is different from the time interval used during recording the sound of the pulse. The goal of introducing the new time interval is to make the extracted time series $\{z_i\}$ independent on the pulse rate.

Values $t_0$ and $t_3$ are found so that $t_2-t_0=600 \Delta t$ and $t_3-t_2=600 \Delta t$.

Time series $\{z_i\}$ is presented as a sequence of 1200 values calculated in the interval from $t_0$ to $t_3$ with step $\Delta t$ using microphone record of the pulse sound.

The same pair of RSA keys which is used for palm image can be used for pulse record.

The representational array R for pulse is different from that for palm because it has to have 2400 (2*1200) terms.

The algorithm for processing data described above for palm image and illustrated in FIG. 1 and FIG. 4 remains the same for the pulse record.

The advantages of the proposed method are as follows:
a user is represented at the server by a set of random numbers that have nothing to do with his biometric data, so real biometric data cannot be retrieved even theoretically from a data of the server if it is compromised,
the method provides zero leakage of the privacy of a user because none of biometric data is stored on hardware of the server or the client and none of biometric data is transmitted between them (the array close to random array R is transmitted);
the fuzzy dynamic keys created by the client are not saved anywhere, so there is no need to create/memorize/store any passwords; there is also no need to store any helper data;
the method is resistant to known types of attacks, including offline attacks,
the method is resistant to imitations: to imitate an authorized user a hacker has to simultaneously imitate an image of the user's palm and the shape of the user's pulse;
the method provides regular frequent authentications of a user without interruption of his activity from the beginning of a session to the end.

The same idea can be implemented on the base of a handheld mobile communication devices, phones and similar devices. The camera is embedded at the back of the device and faces user's palm while he holds the device. The microphone is embedded at the edge of the device at the place where the base of a user's thumb is pressing the device.

Although the present invention has been described in terms of the preferred embodiments, it is to be understood that the disclosure is not to be interpreted as limiting. Various modifications will become apparent to those skilled in the art after having read this disclosure. For example, instead of recording one image of a palm made on a click of the mouse it is possible to use all available frames recorded by the camera in order to better extract details of the image. Other imaging systems can be embedded into the mouse instead of the camera. For example, in case of imbedded LIDAR on base of 2-D antenna array [J. K. Doylend, M. J. R. Heck, J. T. Bovington, J. D. Peters, L. A. Coldren, and J. E. Bowers, "Two-dimensional free-space beam steering with an optical phased array on silicon-on-insulator," Opt. Express 19, 21595-21604 (2011)] the image of the palm is not regular, but topographical image; however the proposed method is still applicable. The imaging system can be configured to register image of a thumb or a pointer finger, and so on. All mentioned modifications of the proposed method do not change it radically. Accordingly, it is intended that the appended claims be interpreted as covering all alterations and modifications within the spirit and scope of the invention.

The invention claimed is:

1. A method for active biometric user authentication during a session of client-server communication running on a handheld device with an embedded webcam facing a palm of a user comprising the following two steps: a login of a user to a session and identity verification of the user performed by the server, where the step "a login of a user to a session" comprises:

generating, on the client, a random pair of a private key and a public key unrelated to the user's biometry;

submitting the public key to the server;

extracting a biometric array $Z=\{z_1, z_2, z_3, \ldots, z_N\}$ from an image of the user's palm recorded by the webcam, where N is the number of components in the array Z;

generating, on the server, an array of random numbers $R=\{r_1, r_2, r_3, \ldots, r_N\}$ unrelated to the user's biometry and representing the user;

calculating, on the client, an array of multiplying coefficients $C=\{c_1, c_2, c_3, \ldots, c_N\}$, where $c_i=r_i/(z_i-\bar{z})$ and $\bar{z}=(z_1+z_2+\ldots+z_N)/N$ is an average of components of Z;

the step "identity verifications of the user" comprises:

recording an image of the user's palm by the webcam;

generating a random permutation of N integers on the server;

encoding the permutation with the help of the public key on the server;

sending the encoded permutation to the client;

extracting on the client a biometric array $Z_{new}$ from the image of the user's palm;

calculating on the client a representational array $R_{new}=(Z_{new}-\bar{z}_{new})C$ (component by component multiplication), where $\bar{z}_{new}$ is an average of components of $Z_{new}$;

decoding on the client with the help of the private key the encoded permutation received from the server;

applying on the client the decoded permutation to the array $R_{new}$;

submitting the permuted array to the server;

applying the permutation created on the server to the array R created on the server;

comparing this permuted array with the array submitted by the client;

making a verification decision based on the correlation coefficient between these two arrays: the user is verified positively if the coefficient is greater than 0.7.

* * * * *